United States Patent [19]

Ehara

[11] Patent Number: 4,707,819
[45] Date of Patent: Nov. 17, 1987

[54] DISC DRIVING DEVICE

[76] Inventor: Takashi Ehara, 10-19, Touka-machi, Furukawa-shi, Miyagi-ken, Japan

[21] Appl. No.: 836,999

[22] Filed: Mar. 6, 1986

[30] Foreign Application Priority Data

Mar. 6, 1985 [JP] Japan .............................. 60-30848[U]

[51] Int. Cl.[4] ....................... G11B 23/02; G11B 25/04
[52] U.S. Cl. ..................... 369/77.2; 360/99; 360/133
[58] Field of Search ................. 369/77.1, 77.2, 75.2; 360/133, 97, 99

[56] References Cited

U.S. PATENT DOCUMENTS

| 4,111,430 | 9/1978 | Johnson | 369/77.1 |
| 4,485,464 | 11/1984 | Shimaoka | 369/77.1 |
| 4,486,873 | 12/1984 | Takahashi et al. | 369/77.1 |
| 4,592,040 | 5/1986 | Ohsaki | 369/77.1 |
| 4,608,681 | 8/1986 | Shiosaki | 369/77.2 |
| 4,625,304 | 11/1986 | Kanamaru et al. | 369/77.1 |
| 4,627,037 | 12/1986 | Tamaru et al. | 369/77.2 |
| 4,627,042 | 12/1986 | Hara | 369/77.1 |

Primary Examiner—Steven L. Stephan

[57] ABSTRACT

A disc driving device includes an insertion slot for a disc cartridge, a cartridge holder for receiving an inserted cartridge, a slider which engages the front end of the inserted cartridge and is displaced inward therewith, a lock lever for locking a cam plate in an ejecting position, and the cam plate having cam slots engaging rollers on the cartridge holder for moving the cartridge holder to a loading position when the lock lever is released. The slider moves one end of a spring member in conjunction with insertion of the disc cartridge part way into the device, such that the spring member becomes compressed and reoriented and exerts a repulsive force along the insertion direction in order to draw the disc cartridge the remainder of the way in, and also releases the lock lever to move the cartridge to the loading position automatically.

3 Claims, 34 Drawing Figures

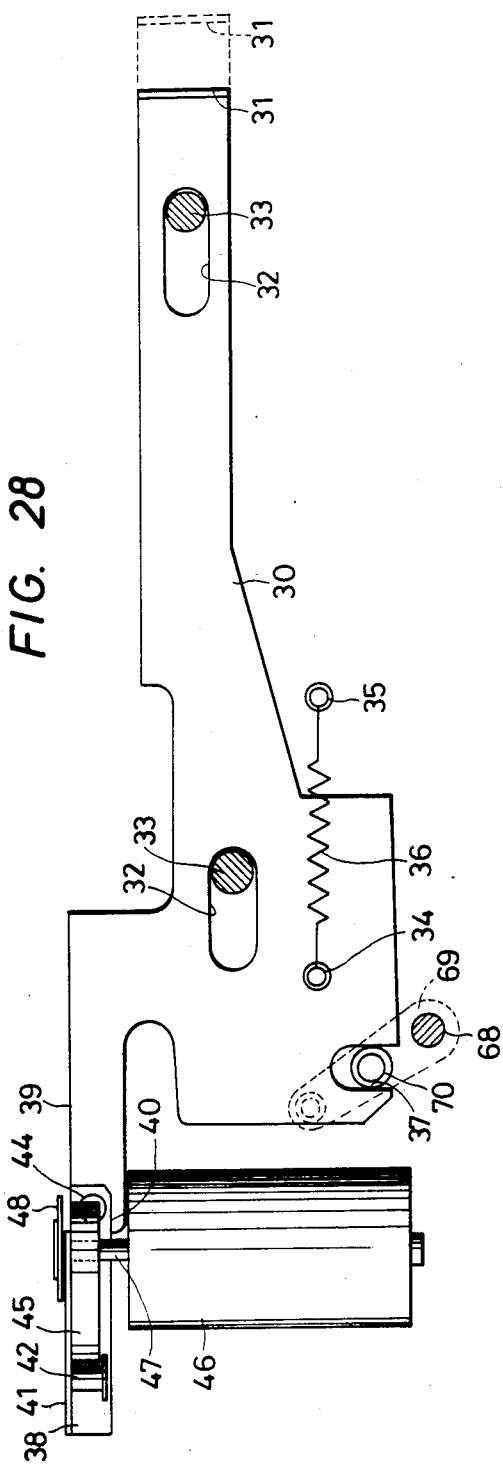
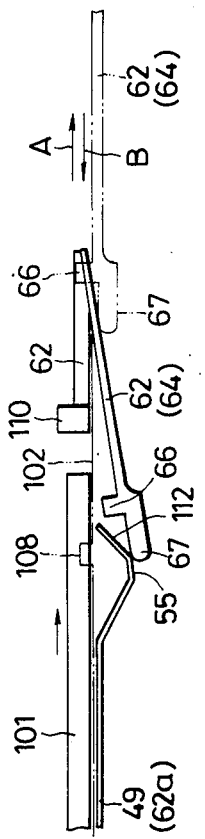
FIG. 28
FIG. 29

DISC DRIVING DEVICE

BACKGROUND OF THE INVENTION

This invention relates to a disc driving device employing a disc cartridge such as a magnetic disc cartridge or an optical disc cartridge.

SUMMARY OF THE INVENTION

It is an object of the present invention to provide a disc driving device which may automatically securely move a disc cartridge up to a loading position and may attain a reliable driving position.

According to the present invention, the disc driving device comprises a slider adapted to be engaged with a disc cartridge to draw the disc cartridge in an inserting direction, a spring member having one end engaged with the slider and the other end supported at a position apart from a moving passage of the slider, the distance between the one end and the other end being changeable, a moving means for moving the inserted disc cartridge as inserted up to a loading position, and a locking means for stopping operation of the moving means, wherein the slider moves the one end of the spring member in conjunction with insertion of the disc cartridge part way into the device, such that the spring member becomes compressed and reoriented and exerts a repulsive force along the insertion direction in order to draw the disc cartridge the remainder of the way in and also releases the locking means to move the cartridge to the loading position automatically.

The invention will be more fully understood from the following detailed description and appended claims when taken with the drawings.

BRIEF DESCRIPTION OF THE DRAWINGS

FIGS. 27 and 28 are illustrations showing conditions of the eject lever before ejecting and during ejecting, respectively;

FIG. 29 is an illustration showing displacement of the slider;

DETAILED DESCRIPTION OF THE PREFERRED EMBODIMENT

There will be described a preferred embodiment of the present invention with reference to the drawings. The magnetic disc driving device according to the preferred embodiment is provided with an automatic loading mechanism and an automatic ejecting mechanism. These mechanisms serve to automatically move a magnetic disc cartridge to a loading position in the magnetic disc driving device according to a command signal from an external computer control unit, for example, or automatically move the magnetic disc cartridge in the loading position to an eject opening of the disc driving device. However, these mechanisms are also adapted to manually move the magnetic disc cartridge to the eject opening of the disc driving device.

There will be firstly described a structure of the disc driving device, and second described an automatic loading operation and an automatic ejecting operation.

(1) Description of the Structure of the Disc Driving Device

Figure 1:
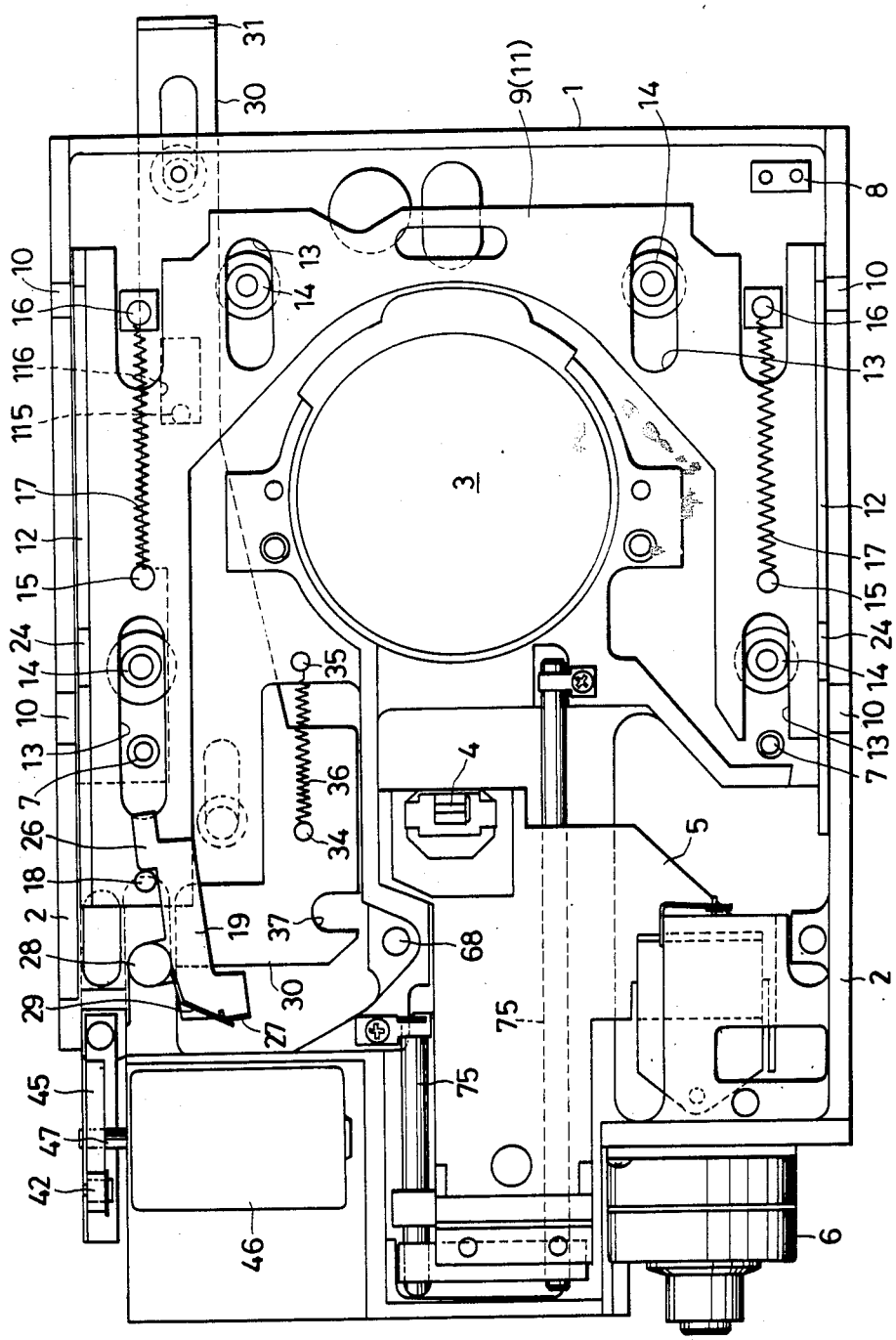
FIG. 1 is a plan view of the disc driving device according to the invention under a condition where some parts are removed.

FIG. 1 is a plan view of the disc driving device under the condition where some parts such as a cartridge holder are removed.

Figure 26:
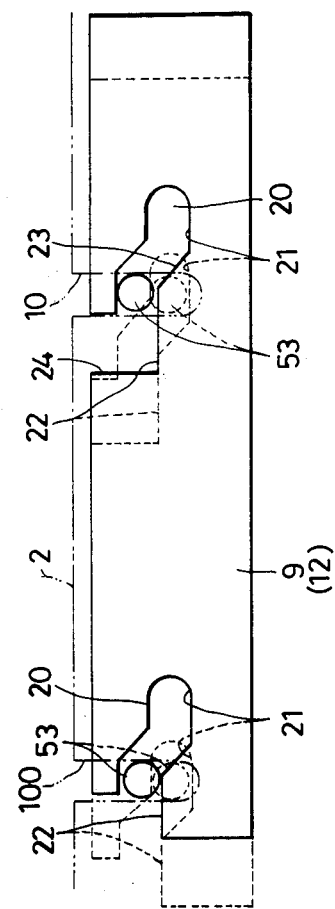
FIG. 26 is an illustration showing displacement of the slider plate and rollers.

Side plates 2 are projected from both sides of a base 1, and each of the side plates 2 is formed with two vertically extending roller guide recesses 10 (See FIG. 26). A DD motor 3 is fixed at a central portion of the base 1, and a carriage 5 mounting a magnetic head 4 thereon is arranged in the vicinity of the DD motor 3 in such a manner as to be reciprocatable in a predetermined direction. A stepping motor 6 for driving the carriage 5 is connected through a screw shaft (not shown) to an engaging member (not shown) of the carriage 5. Two reference pins 7 are upwardly projected from a predetermined position of the base 1, and act to position the magnetic disc cartridge in the disc driving device. Reference number 8 designates a cartridge sensor provided near a cartridge inlet/outlet, a structure of which will be hereinafter described.

Figure 2:
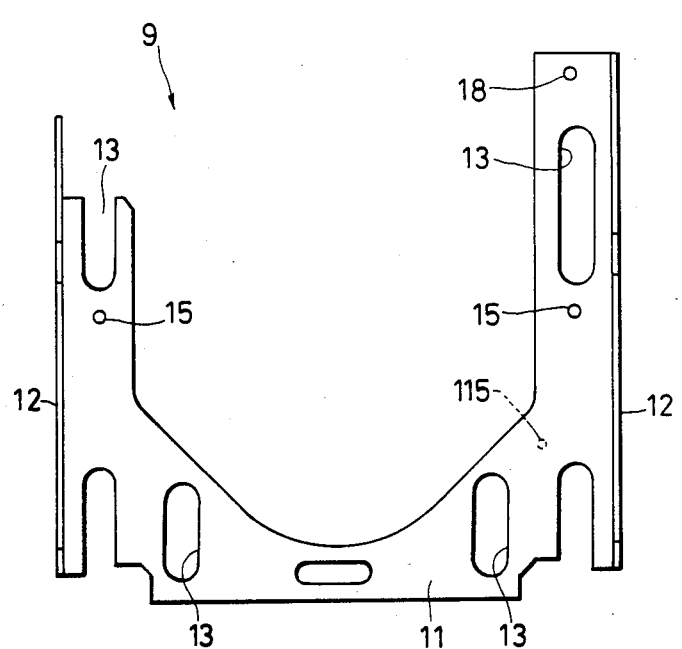
FIGS. 2, 3 and 4 are a plan, elevational and side view of a slide plate, respectively.
Figure 4:
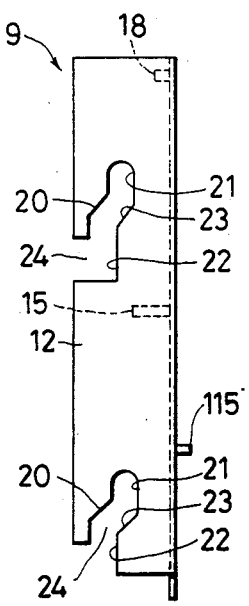
Figure 3:
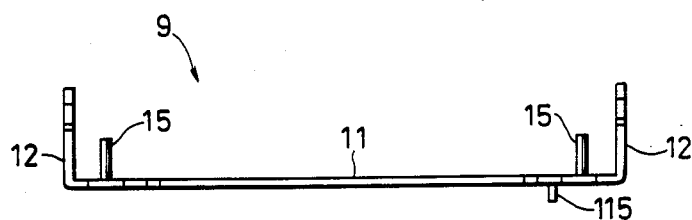

A slide plate 9 is arranged on the base 1 in such a manner as to be slidable in an injecting direction. FIGS. 2, 3 and 4 are a plan, elevational and side view of the slide plate 9, respectively.

As shown in FIG. 3, the slide plate 9 is constituted of a bottom plate portion 11 and side plate portions 12 upwardly extending from both sides of the bottom plate portion 11. Namely, the slide plate 9 is formed in an elevationally U-shape. The bottom plan portion 11 is formed with elongated slide channels 13 at a predetermined position, extending in a sliding direction of the slide plate 9, and as shown in FIG. 1, boss portions 14 projecting from the base 1 are inserted in the slide channels 13. Spring retainer pins 15 are projected from both sides of the bottom plate portion 11, and as shown in FIG. 1, tension springs 17 are engaged with the spring retainer pins 15 and other spring retainer pins 16 projected from the base 1. Accordingly, the slide plate 9 is normally resiliently biased toward the cartridge inlet/outlet side (right-hand side in FIG. 1) by the spring force of the tension springs 17. As shown in FIG. 2, an engaging pin 18 is projected from a right upper portion of the slide plate 9, and is adapted to be engaged with a lock lever which will be hereinafter described. A drive pin 115 is downwardly projected from the bottom plate portion 11, and is adapted to be inserted into a rectangular hole 116 formed through an eject lever 30 which will be hereinafter described.

As shown in FIGS. 4 and 26, each of the side plate portions 12 is formed with two cam channels 20 which are opened at upper portions. Each of the cam channels 20 is constituted of a lower horizontal portion 21, upper horizontal portion 22 and slant portion 23 connecting both the horizontal portions 21 and 22.

Figure 5:
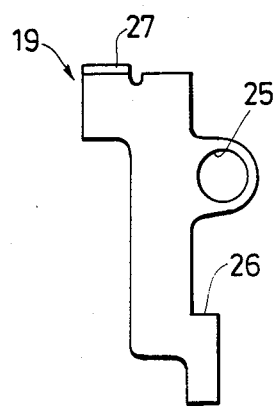
FIGS. 5 and 6 are a plan and elevational view of a lock lever, respectively.
Figure 6:
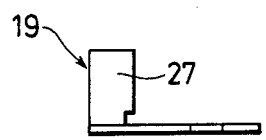

FIGS. 5 and 6 are a plan and elevational view of the lock lever 19, respectively. As shown in FIG. 5, the lock lever 19 is formed with a through-hole 25 at an intermediate portion thereof, and is provided with an engaging angular portion 26 on a front side of the through-hole 25. Further, an upright member 27 is projected at a rear side of the through-hole 25.

As shown in FIG. 1, the lock lever 19 is rotatably supported on a support pin 28 to the base 1, and is arranged in such a manner that the engaging angular portion 26 may be engaged with the engaging pin 18 of the slide plate 9. A spiral spring 29 is supported on the support pin 28, and resiliently abuts against the side plate 2 at one end thereof, while resiliently abutting against the upright member 27 of the lock lever 19 at the other end thereof. The spiral spring 29 is resiliently biased in a direction such that the angular portion 26 of lock lever 19 comes into engagement with the pin 18.

As shown in FIG. 1, the eject lever 30 is supported at the lower portion of the base 1 in such a manner as to be slidable in the ejecting direction, and is arranged in such a manner that an operating button mount portion 31 of the eject lever 30 is projected from the base 1 to the front side.

Figure 7:
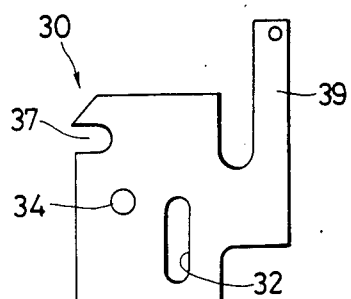
FIGS. 7 and 8 are a plan and side view of an eject lever, respectively.
Figure 8:
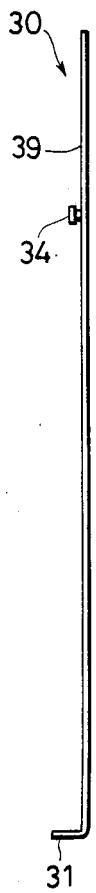
Figure 27:
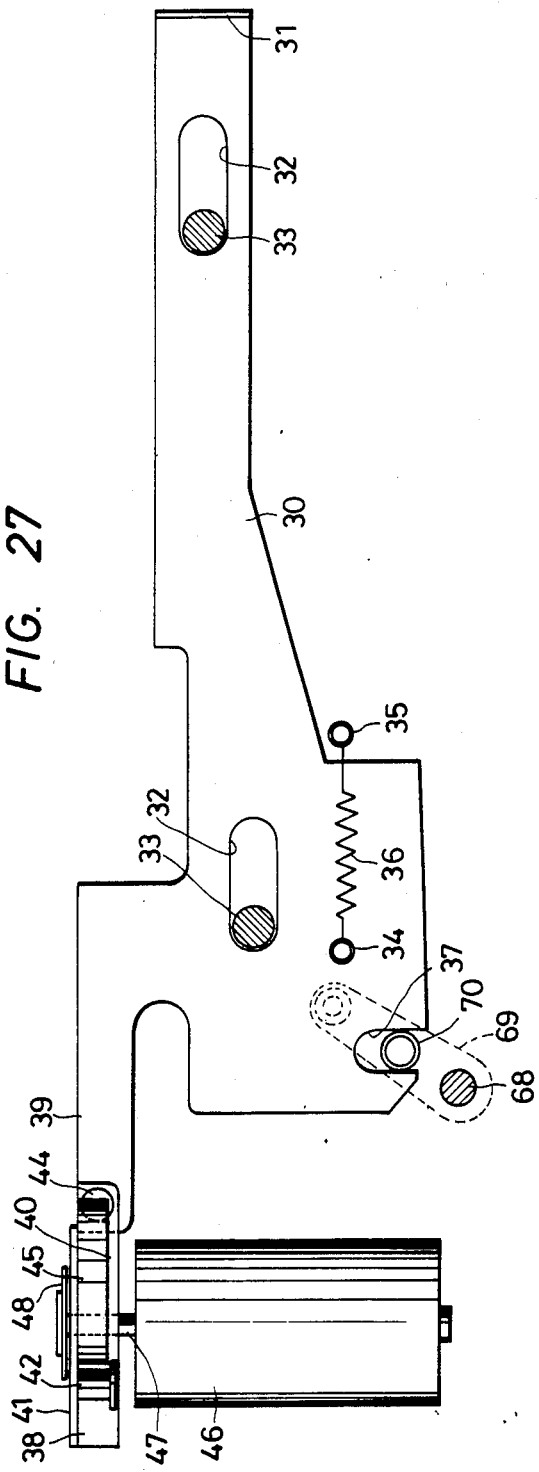

FIGS. 7 and 8 are a plan and side view of the eject lever 30, respectively. The eject lever 30 is formed with elongated guide channels 32 at a predetermined position, and as shown in FIGS. 27 and 28, boss portions 33 projecting from the base 1 are inserted into the guide channels 32. Further, the eject lever 30 is provided with a spring retainer pin 34 projecting therefrom at a predetermined position, and a tension spring 36 is engaged with the spring retainer pin 34 and another spring retainer pin 35 projecting from the base 1 (See FIGS. 1, 27 and 28). As a result, the eject lever 30 is resiliently biased in the ejecting direction.

The eject lever 30 is formed with an elongated lever driving recess 37 extending in a direction perpendicular to the sliding direction of the eject lever 30. The eject lever 30 is further formed with a connecting portion 39 for connecting a lever drawing member 38 at one end thereof, and is also formed with a rectangular hole 116 at a predetermined position thereof.

Figure 9:
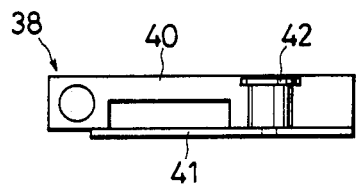
FIGS. 9 and 10 are a plan side view of a lever drawing member, respectively.
Figure 10:
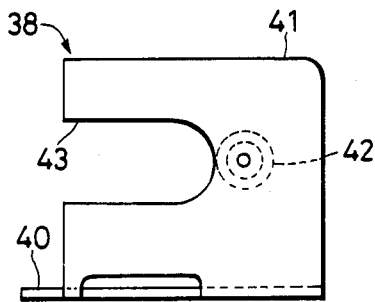

FIGS. 9 and 10 are a plan and side view of the lever drawing member 38. The lever drawing member 38 is constituted of a planar connecting portion 40 connected with the eject lever 30, a vertical wall 41 upwardly projecting from one side end of the connecting portion 40, and a horizontal contact pin 42 mounted to the vertical wall 41. As shown in FIG. 10, the vertical wall 41 is formed with a horizontally extending recess 43 opening to the eject lever 30 side.

Figure 33:
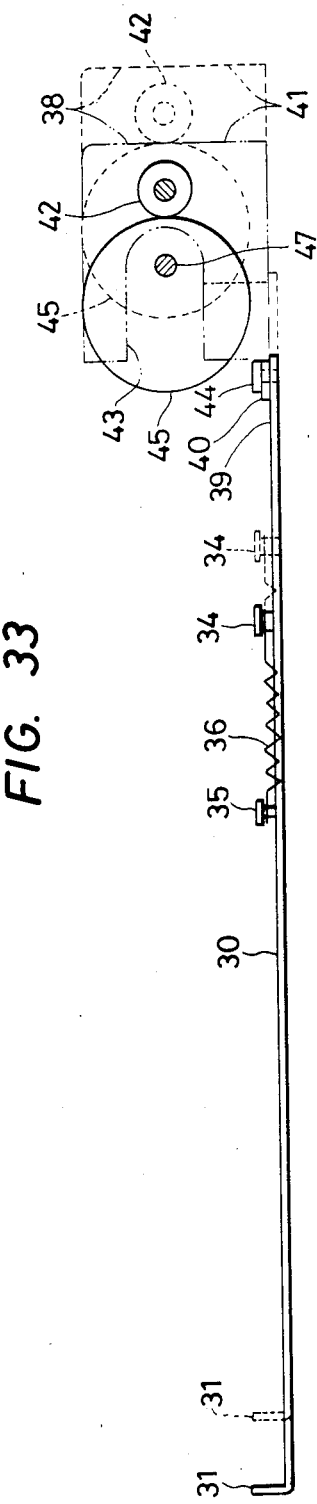
FIG. 33 is a partially side view showing a drawing condition of the eject lever upon ejecting.

As shown in FIGS. 27 and 33, the eject lever 30 and the lever drawing member 38 are connected with each other through a connecting pin 44, and are adapted to be slid together.

As shown in these drawings, a circumferential surface of an eccentric cam 45 is in contact with a circumferential surface of the contact pin 42 of the lever drawing member 38, and such contact condition as above is maintained by the tension spring 36. A rotary shaft 47 of an eject motor 46 for rotatably driving the eccentric cam 45 passes through a rotational center of the eccentric cam 45, and retains a washer 48 at a tip end thereof. The rotary shaft 47 passes through the recess 43 of the lever drawing member 38, and the washer 48 is located near an outer side surface of the vertical wall 41. Accordingly, the washer 48 serves as a guide member during sliding of the lever drawing member 38, and axial deviation of the contract pin 42 relative to the eccentric cam 45 may be prevented.

FIGS. 11, 12, 13 and 14 are a top plan, elevational, bottom plan and side view of a cartridge holder 49.

Figure 12:
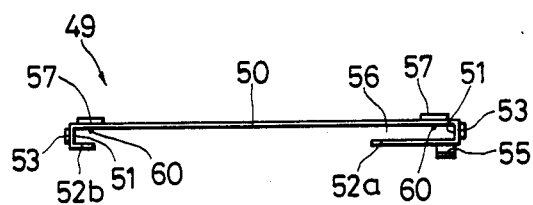

The cartridge holder 49 is mainly constituted of an upper plate 50, side plates 51 downwardly extending from both side ends of the upper plate 50, and lower plates 52a and 52b horizontally extending inwardly from lower ends of the side plates 51 to a small extent. As shown in FIG. 12, a space 56 where the magnetic disc cartridge is to be inserted is defined by the upper plate 50, the side plates 51 and the lower plates 52a and 52b.

Two rollers 53 arranged at a predetermined distance are rotatably supported on each of outer surfaces of the side plates 51.

Figure 11:
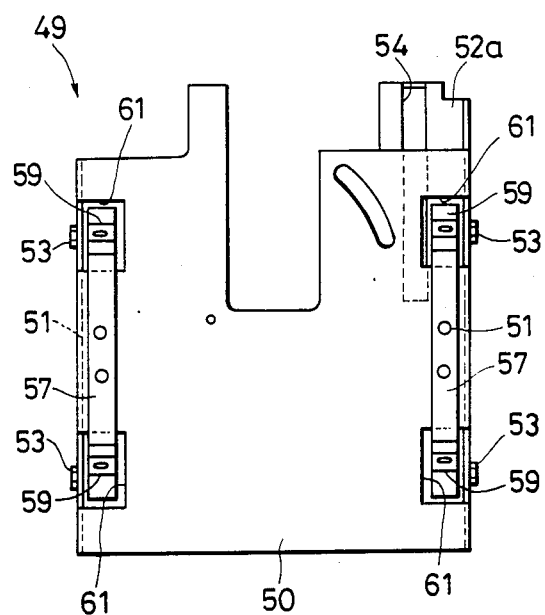
FIGS. 11, 12, 13 and 14 are a top plan, elevational, bottom plan and side view of a cartridge holder, respectively.
Figure 15:
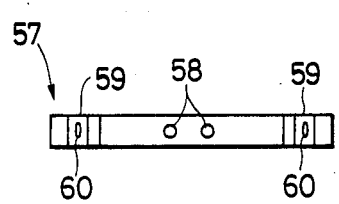
FIGS. 15 and 16 are a plan and elevational view of a leaf spring, respectively.
Figure 16:
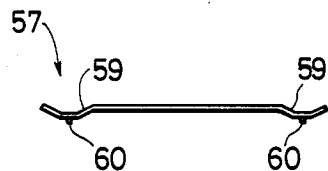

As shown in FIG. 11, leaf springs 57 are mounted at a position near the side plates 51 on the upper plate 50 in such a manner as to be in substantially parallel to the side plates 51. As shown in FIGS. 15 and 16, each of the leaf springs 57 is formed with mount holes 58 at a central portion thereof, and trapezoidal bent portions 59 which are downwardly bent are formed at free ends on both sides of the leaf spring 57. Each of the bent portions 59 is provided with a downwardly projecting portion 60 at a substantial center thereof. As shown in FIG. 11, each portion of the upper plate 50 has an opening 61 corresponding to the bent portions 59 of the leaf spring 57. Therefore, when the leaf spring 57 is mounted to the upper plate 50, the bent portions 59 are disposed slightly inside the space 56 through the openings 61 (See FIG. 12).

Figure 13:
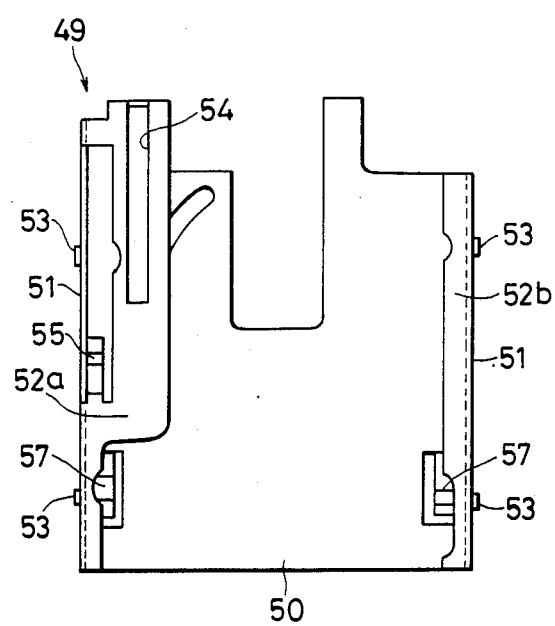
Figure 14:
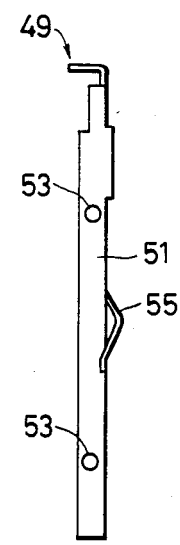

As shown in FIG. 13, the lower plate 52a is formed with a guide channel 54 extending in an inserting direction of the magnetic disc cartridge, and is also formed with a restricting member 56 which is downwardly bent in a V-shape on the front side of the guide channel 18. A slider 62 is slidably installed in the guide channel 54.

Figure 17:
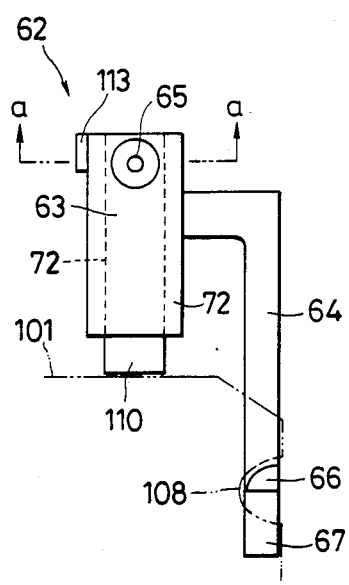
FIGS. 17, 18 and 19 are a plan, elevational and side view of a slider, respectively.
Figure 19:
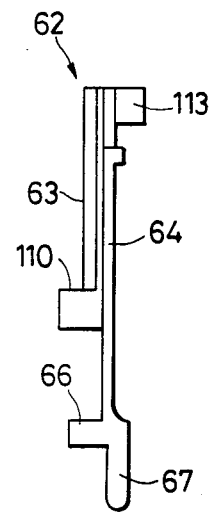
Figure 18:
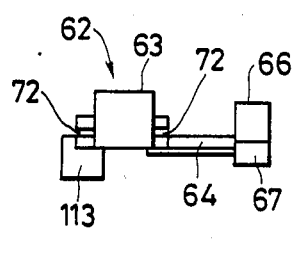
Figure 20:
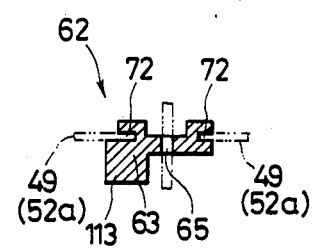
FIG. 20 is a cross-section taken along the line A—A in FIG. 17.

FIGS. 17, 18 and 19 are a plan, elevational and side view of the slider 62, and FIG. 20 is a cross-section taken along the line A—A in FIG. 17.

The slider 62 is formed of synthetic resin such as polyacetal resin having wear resistance and good lubricating property, and as shown in FIG. 17, it is constituted of a slider body 63 and an arm portion 64 projecting from a side surface of the slider body 63 in a L- shape. The slider body 63 is formed with a spring retainer vertical through-hole 65 at a predetermined position, and is also formed with longitudinally extending grooves 72 at both side surfaces thereof. As shown by a dashed line in FIG. 20, the slider 62 is slidably mounted to the cartridge holder 49 by fitting an end of the guide channel 54 formed through the lower plate 52a of the cartridge holder 49 in the grooves 72.

As shown in FIG. 19, the arm portion 64 is thin-walled so as to have flexibility, and is formed at its free end with an upwardly projecting engagement pin 66 and a round tipped contact portion 67.

Figure 21:
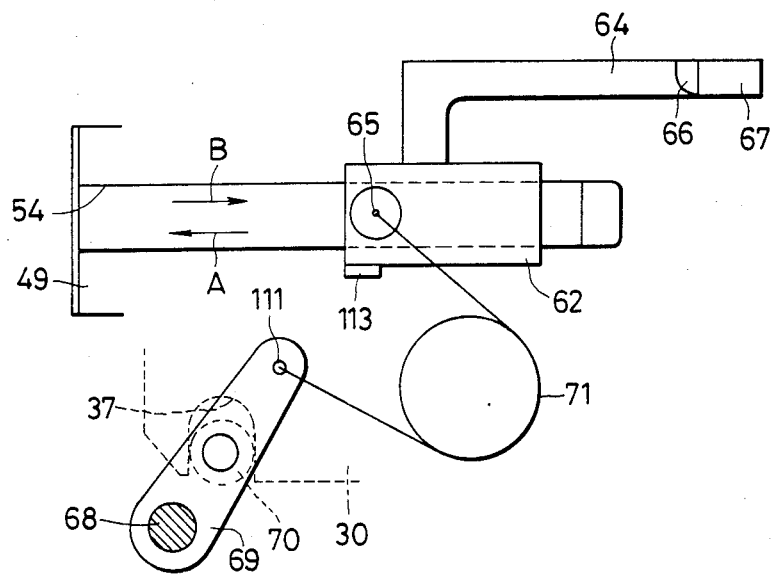
FIG. 21 is a plan view of a part near a coil spring.

As shown in FIG. 1, there is provided a pin 68 projecting from the base 1 near the lever driving channel 37 of the eject lever 30, and as shown in FIG. 21, the pin 68 is inserted into a base portion of a rotating lever 69. As shown in FIG. 21, a roller 70 is rotatably supported at a longitudinal intermediate portion of the rotating lever 69, and a spring retainer hole 111 is formed at a free end of the lever 69. A coil spring 71 is provided between the spring retainer hole 111 of the rotating lever 69 and the spring retainer hole 65 of the slider 62. The coil spring 71 is displaced by the movement of the rotating lever 69 or the slider 62 as will be hereinafter described.

Figure 22:
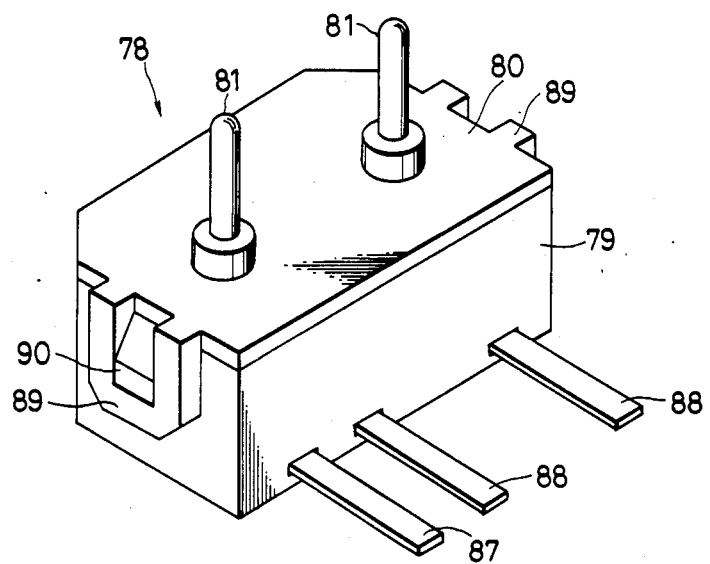
FIGS. 22, 23 and 24 are an assembled perspective, exploded perspective and vertical sectional view of a cartridge sensor, respectively.
Figure 23:
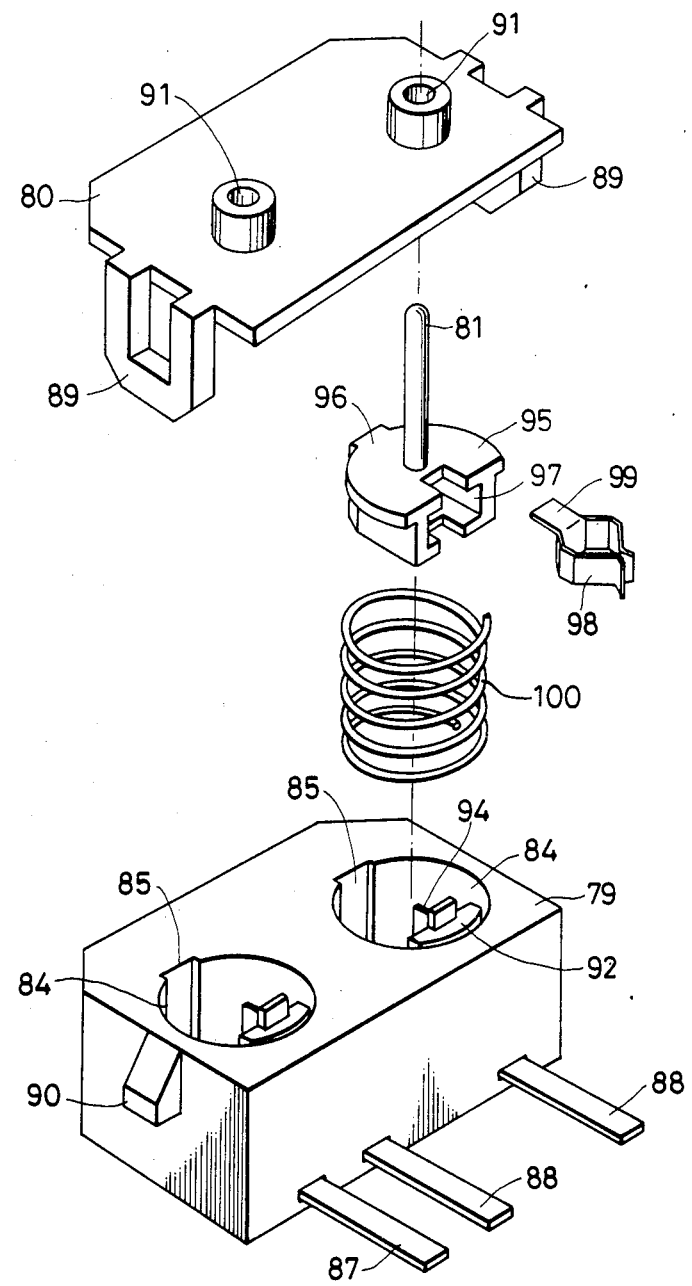
Figure 24:
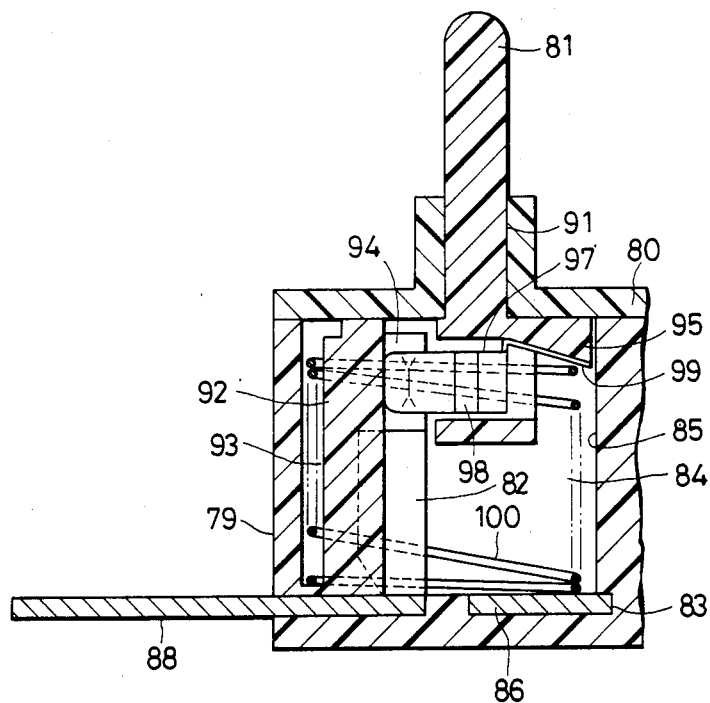
Figure 25:
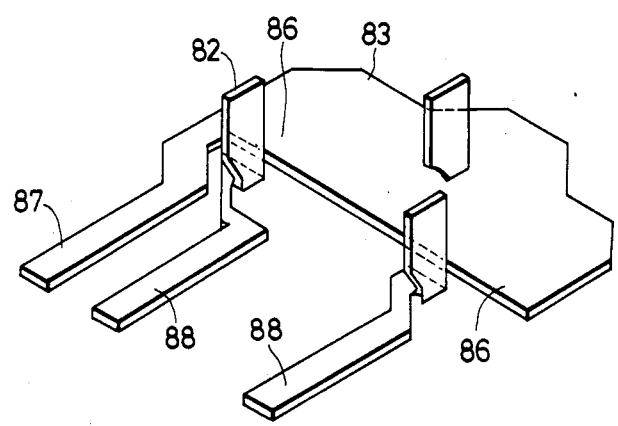
FIG. 25 is a perspective view of a contact metal fitting and a fixed contact piece of the sensor.

There will now be described the cartridge sensor 8 with reference to FIGS. 22 to 25. FIGS. 22, 23 and 24 are an assembled perspective, exploded perspective and vertical sectional view of the cartridge sensor 8, respectively, and FIG. 25 is a perspective view of a contact metal fitting and a fixed contact piece of the sensor.

The cartridge sensor 8 is a double switch having two operating levers 81 projecting from a cover 80 on a wafer 79. When either of the two operating levers 81 is pushed, either of two fixed contact pieces 82 as shown in FIG. 25 is electrically connected to a contact metal fitting 83.

The wafer 79 formed of a synthetic resin is provided with two operating chambers 84 as shown in FIG. 23. Each of the operating chambers 84 is circularly formed, and is formed with a vertical guide channel 85 on a circumference thereof.

A support member 92 is formed in each of the operating chambers 84 in such a manner as to upwardly extend from a bottom portion of the operating chamber 84, and there is provided a spring channel 93 between an outer surface of the support member 92 and an inner circumferential surface of the operating chamber 84. The support member 92 is provided with a non-conductive piece 94 projecting inwardly in the operating chamber 84 at an upper portion thereof. The contact metal fitting 83 serving as a common contact piece is insert-molded in the wafer 79. The contact metal fitting 83 is formed of a metal plate having a shape as shown in FIG. 25, and is formed with two contact opposed portions 86. A terminal 87 is integrally formed with the contact metal fitting 83 at its end portion. The terminal 87 is outwardly projected from the wafer 79.

The fixed contact piece 82 is also formed of a metal plate, and is insert-molded in the wafer 79. As shown in FIGS. 24 and 25, a lower portion of the fixed contact piece 82 is bent at right angles to form terminals 88. The terminals 88 are outwardly projected from the wafer 79. As shown in FIG. 24, the fixed contact piece 82 is retained by the support member 92 in the operating chamber 84, and is located below the non-conductive piece 94.

The cover 80 for covering an upper surface of the wafer 79 is formed of synthetic resin, and is formed with hooks 89 at both ends thereof. On the other hand, the wafer 79 is formed with projections 90 on both side surfaces which are engaged with the hooks 89 to fix the cover 80 with the wafer 79. The cover 80 is formed with through-holes 91 at a portion opposed to the operating chambers 84 of the wafer 79, and the pin-like operating levers 81 are upwardly projected from the through-holes 91.

The operating lever 81 and a slider 95 provided at a lower end thereof are integrally formed of synthetic resin. The slider 95 is of substantially the same shape in plan as of the operating chamber 84. The slider 95 is formed with a projecting portion 96 of a circumference thereof which is fitted with the guide channel 85 of the operating chamber 95, thereby permitting the slider 95 to be vertically smoothly slided without rotation in the operating chamber 85.

A movable contact piece 98 is engaged with a hole 97 formed in the slider 95. The movable contact piece 98 is of a clip-like shape so as to hold the fixed contact piece 82 and the non-conductive piece 94. A conductive piece 99 is integrally formed with the movable contact piece 98 at its rear portion. The conductive piece 99 is exposed from a rear portion of the slider 95 to the operating chamber 84.

A coil spring 100 made of conductive material is inserted in the operating chamber 84, and as shown in FIG. 24, a part of the coil spring 100 is received in the spring channel 93. A part of the coil spring 100 is in contact with the contact opposed portions 86 of the contact metal fitting 83, while the coil spring 100 is not in contact with the fixed contact piece 82 because a lower end of the spring channel 93 is disposed over the terminal 88 of the fixed contact piece 82. An upper end of the coil spring 100 is in contact with the conductive piece 99 of the movable contact piece 98, and therefore the movable contact piece 98 is electrically connected through the coil spring 100 to the contact metal fitting 83.

As shown in FIG. 24, the slider 95 is upwardly urged by a resilient force of the coil spring 100. Under the condition, the movable contact piece 98 is in contact with the non-conductive piece 94. Accordingly, the movable contact piece 98 is electrically insulated from the fixed contact piece 82, and the contact metal fitting 83 is also electrically insulated from the fixed contact piece 82.

As will be hereinafter described, when the magnetic disc cartridge is lowered to a loading position, the operating levers 81 are pushed down by the magnetic disc cartridge, and the slider 95 is also moved. When the slider 95 is slightly moved, a holding position (contact position) of the movable contact piece 98 is displaced from the nonconductive piece 94 side to the fixed contact piece 82 side. Accordingly, the fixed contact piece 82 is brought into contact with the movable contact piece 98, and the fixed contact piece 82 is electrically connected with the contact metal fitting 83 thereby to form a circuit. By the switch operation as above-mentioned, there is generated a sensor signal informing that the magnetic disc cartridge has reaches the loading position. The cartridge sensor 8 of the abovementioned structure has the feature that it is operable even by a small pushing force.

The automatic loading operation of a disc cartridge in the disc driving device of the foregoing construction will now be described.

(2) Description of the Automatic Loading Operation

First, the condition of each member prior to the automatic loading operation will be described.

Referring to FIG. 1 which shows the overall device in a waiting condition, the engaging pin 18 of the slide plate 9 is engaged with the engaging angular portion 26 of the lock lever 19. Accordingly, the slide plate 9 is retained at a rear waiting position against a tensile force of the tension springs 17.

In the waiting condition, the slide plate 9 is located at a rear position (on a right-hand side in the drawing) as shown in solid lines in FIG. 26, and therefore the rollers 53 are positioned on the upper horizontal portions 22 of the cam channels 20 of the slide plate 9. The condition where the rollers 53 are positioned on the upper horizontal portions 22 as mentioned above means that the cartridge holder 49 integrally connected to the roller 53 is located at the upper position, that is, at the waiting position.

FIG. 27 shows a position of the eject lever 30 in a condition for insertion of the disc cartridge. As shown in FIG. 27, the eject lever 30 is biased forwardly (to the right-hand side) by a tensile force of the tension spring 36, and the rotating lever 69 engaged with the roller 70 in the eject lever 30 is also in the waiting position as shown.

When the rotating lever 69 is in the waiting position in the afore-mentioned manner, the coil spring 71 and the slider 62 which are connected to the rotating lever 69 are in a position as shown in FIG. 21. When the slider 62 is located at the front position (at the right end in the drawing) of the guide channel 54 of the cartridge holder 49, the contact portion 67 of the arm portion 64 of the slider 62 is positioned at the lower portion of the restricting member 55 bent in V-shape. In this position of the contact portion 67, the arm portion 64 is slightly curved downwardly. Accordingly, the engaging pin 66 of the arm portion 64 is located at a slightly lower position from a disc insertion passage 102 of the magnetic disc cartridge 101, where the magnetic disc cartridge 101 is not hindered from being inserted.

Figure 30:
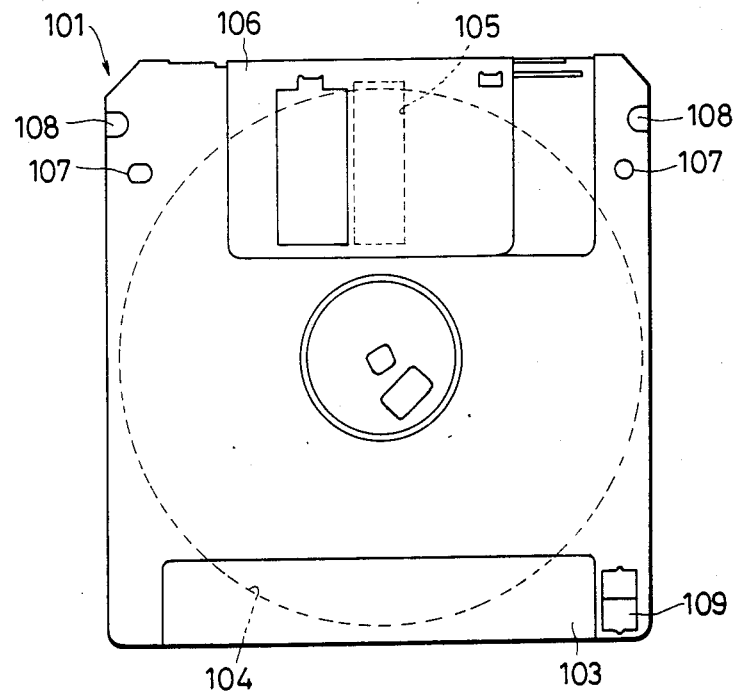
FIG. 30 is a bottom plan view of a magnetic disc cartridge.

FIG. 30 is a bottom plan view of the magnetic disc cartridge. The magnetic disc cartridge is mainly constituted of a cartridge case 103, a magnetic disc 104 rotatably received in the cartridge case 103, and a shutter for opening and closing a magnetic head insertion opening 105 formed at a predetermined position of the cartridge case 103.

There are provided on a bottom surface of the cartridge case 103 recesses 107 for receiving the reference pins 7 of the disc driving device, engaging holes 108 adapted to be engaged with the pins 66 of the slider 62, and a prevention piece 109 for preventing erroneous erasing.

As shown in FIG. 29, the magnetic disc cartridge 101 is inserted from the cartridge inlet/outlet into the cartridge holder 49 with the engaging portion 108 directed to the lower side. As shown in FIG. 12, the leaf springs 57 are mounted to the cartridge holder 49. Therefore, when the magnetic disc cartridge 101 is inserted into the cartridge holder 49, it is resiliently tightly held between the projections 60 of the leaf springs 57 and the lower plates 52a and 52b.

As shown in FIG. 29, since the arm portion 64 of the slider 62 is slightly downwardly curved or flexed, and the engaging pin 66 of the arm portion 64 is located below the disc insertion passage 102, there is no possibility that the engaging pin 66 hinders insertion of the magnetic disc cartridge 101. When the magnetic disc cartridge 101 is inserted, a forward end portion of the cartridge is brought into contact with a contact portion 110 of the slider 62 as shown in FIG. 17, and the slider 62 is urged rearwardly (See arrow A in FIG. 21) by an insertion force of the magnetic disc cartridge 101.

Figure 31:
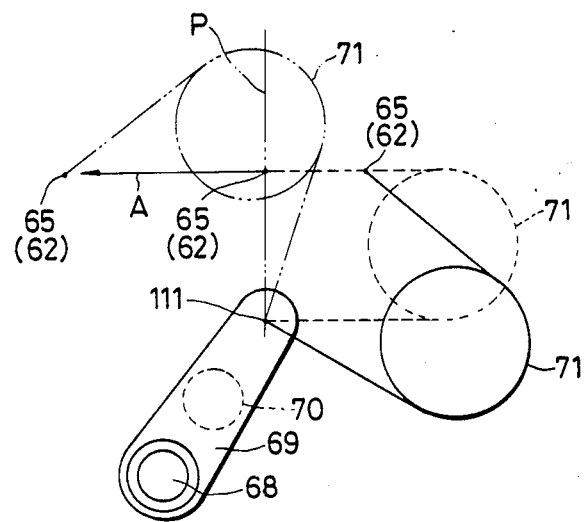
FIG. 31 is an illustration showing operation of the spring member for automatic loading.

FIG. 31 shows the automatic loading function obtained by displacement of the coil spring 71. The coil spring 71 shown in solid lines is in the waiting position. Rotation of the rotating lever 69 is stopped by engagement with the eject lever 30. Therefore, when the slider 62 is urged rearwardly (in the direction of the arrow A) as mentioned above, the coil spring 71 is rotated counterclockwise about the spring retainer hole 111 of the rotating lever 69. As a result, a distance between both free ends of the coil spring 71 is gradually decreased, and when one of the free ends reaches a position where it crosses the straight line P perpendicular to the arrow A, the distance between both the free ends is minimized, and a repulsive force of the coil spring 71 is maximized (at the position shown by a dotted line of the coil spring 71). Until the coil spring 71 comes to the position of the dotted line, the magnetic disc cartridge 101 is inserted into the disc driving device by manually or by mechanical means.

During displacement of the coil spring 71 from the solid line position to the dotted line position as shown in FIG. 31, the contact portion 67 of the slider 62 is gradually returned upwardly along an upward slant surface 112 of the restricting member 55 as shown in FIG. 29 accompanied by the movement of the slider 62 in the direction of the arrow A. As a result, the pin 66 projects into the disc insertion passage 102, and is fitted in the engaging portion 108 of the magnetic disc cartridge 101, thereby engaging the slider 62 with the magnetic disc cartridge 101.

Referring again to FIG. 31, when one of the free ends of the coil spring 71 (the free end inserted in the spring retainer hole 65 of the slider 62) exceeds the straight line P, the free end is again urged in the direction of the arrow A by the repulsive stored force of the coil spring 71 (see the coil spring 71 shown by a two-dot chain line). The slider 62 is moved along the guide channel 54 of the cartridge holder 49 in the direction of the arrow A by the movement of the coil spring 71, and thereby the magnetic disc cartridge 101 is automatically drawn into the disc driving device from the partially inserted position all the way inwardly.

Before the coil spring 71 reaches the position as shown by the two-dot chain line in FIG. 31, a lock release projection 113 provided at a rear end of the slider 62 (See FIGS. 17 to 20) abuts against the upright member 27 of the lock lever 19 (See FIGS. 1, 5 and 6).

As mentioned above, the lock lever 19 is engaged with the engaging pin 18 under the waiting condition as shown in FIG. 1, and this position is retained by a spiral spring 29. However, when the lock release projection 113 of the slider 62 abuts against the upright member 27 of the lock lever 19 as mentioned above, the lock lever 19 is rotated clockwise against a resilient force of the spiral 29 as viewed in FIG. 1. Owing to this rotation, the engaging angular portion 26 of the lock lever 19 is separated from the engaging pin 18, and accordingly the slide plate 9 is pulled toward the front side (disc inlet/outlet side) by a resilient force of the tension springs 17. As mentioned above, the drive pin 115 projecting from the slide plate 9 is inserted in the rectangular hole 116 of the eject lever 30, and it is located at one end of the rectangular hole 116 under the waiting condition as shown in FIG. 1. Therefore, when the slide plate 9 is moved as mentioned above, the drive pin 115 is moved toward the other end of the rectangular hole 116 (See FIG. 32).

Figure 32:
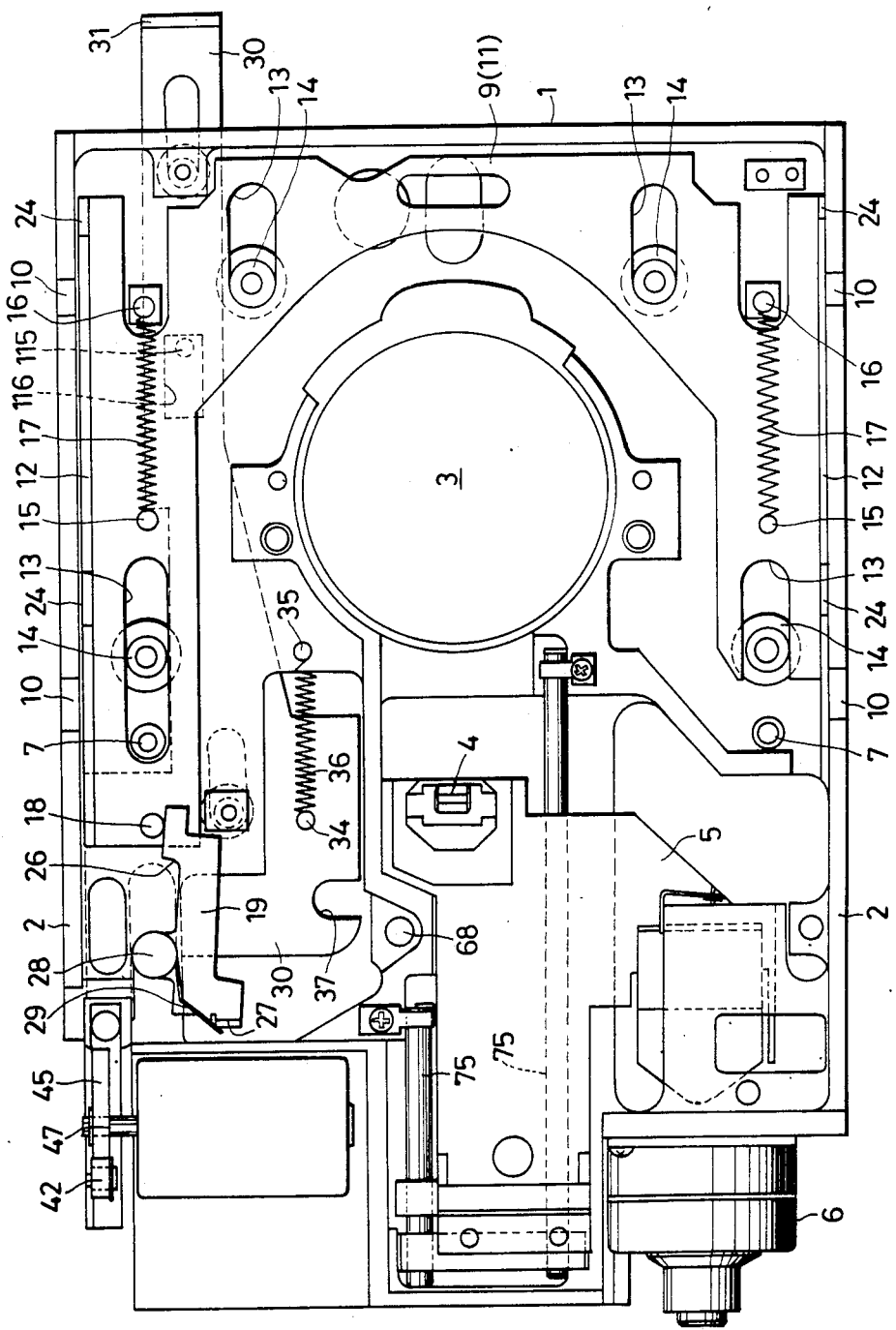
FIG. 32 is a plan view of the disc driving device before ejecting under a condition where some parts are removed.

As shown in FIG. 32, in the position where the slide plate 9 is pulled to the position of the dotted line, the rollers 53 of the cartridge holder 49 are moved from the upper horizontal portions 22 through the slant portions 23 of the lower horizontal portions 21. The rollers 53 are engaged with the cam channels 20 having the upper horizontal portions 22, the slant portions 23 and the lower horizontal portions 21, and are also engaged with the roller guide recesses 10 of the base side plates 2. Therefore, in the case that the slide plate 9 is moved in the front and rear directions, the rollers 53 are not moved together with the slide plate 9, but it is restricted by the roller guide recesses 10 to move vertically. Accordingly, while the slide plate 9 is moved from the solid line position to the dotted line position, the rollers 53 are also moved from the upper position of the solid line to the lower position of the dotted line, and the cartridge holder 49 is also displaced together with the rollers 53. When the cartridge holder 49 reaches the lower position in this way, each of the ends of the reference pins 7 is inserted into the recesses 107 of the magnetic disc cartridge 101 retained inside of the holder 49, and the magnetic disc cartridge 101 is pressed toward the reference pins 7 by the leaf springs 57 of the cartridge holder 49 and is thereby retained in the loading position.

As is afore mentioned, all the operations after passing of the free end of the coil spring 71 through the straight line P (See FIG. 31), that is, the drawing inward of the magnetic disc cartridge 101, lock releasing of the slide plate 9 accompanied by the movement of the slider 62, and the subsequent movement of the magnetic disc cartridge 101 to the loading position are automatically conducted. Thusly, the automatic loading operation is terminated. Under such condition that the magnetic disc cartridge 101 is set in the loading position in this manner, writing to the magnetic disc 104 and reading therefrom are conducted.

(3) Description of the Automatic Ejecting Operation

There will be described operation of the automatic ejecting mechanism for automatically ejecting the magnetic disc cartridge 101 from the disc driving device.

FIG. 32 is a plan view of the disc driving device before the ejecting operation. In this condition, the lock lever 19 is disengaged from the slide plate 9, and the slide plate 9 is located at the front position.

The eject motor 46 is started according to the automatic eject signal from a control unit (not shown), and thereby the eccentric cam 45 is rotated about the rotary shaft 47. Referring to FIG. 27 showing the condition before the ejecting operation, when the eccentric cam 45 is rotated, the contact pin 42 is urged to the left-hand side of the drawing against the resilient force of the tension spring 36. The lever drawing member 38 and eject lever 30 are moved with the contact pin 42. In association with the drawing operation of the eject lever 30, the rotating lever 69 engaged with the eject lever 30 is rotated about the pin 68. FIG. 33 shows a drawing condition of the eject lever 30 upon ejecting, in which a solid line shows a condition before drawing, while a dotted line shows a condition after drawing.

As shown in FIG. 32, because the front side end of the rectangular hole 116 of the eject lever 30 is opposed to the drive pin 115 of the slide plate 9, the slide plate 9 is rearwardly moved with the eject lever 30 through the drive pin 115. When the engaging angular portion 26 of the slide plate 9 comes to a position engageable with the engaging pin 18, the lock lever 19 is rotated by the spiral spring 29 thereby to engage the angular portion 26 with the pin 18 and lock the slide plate 9.

When the slide plate 9 is moved in the aforementioned manner, the rollers 53 shown by the dotted line in FIG. 26 rise from the lower horizontal portions 21 along the slant portions 23 up to the upper horizontal portions 22 shown by the solid line. In association with the movement of the rollers 53, the cartridge holder 49 also rises up to a position where the ejecting operation may be conducted. Further, locking of the slide plate 9 is designed to be completed just before the cartridge holder 49 reaches the ejecting position.

Figure 34:
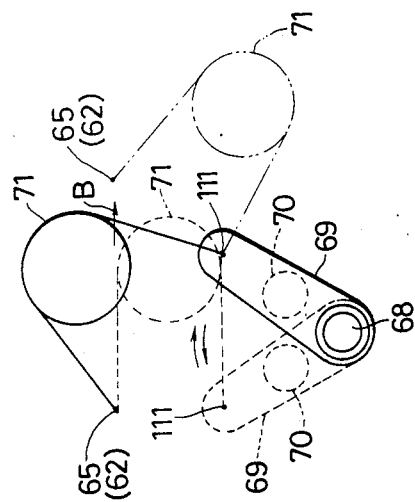
FIG. 34 is an illustration showing operation of the spring member for automatic ejecting.

FIG. 34 shows operation of the rotating lever 69 and the coil spring 71 upon automatic ejecting. In the drawing, the rotating lever 69 and the coil spring 71 both shown by the solid line are in condition before ejecting. As mentioned above, the rotating lever 69 is rotated counterclockwise about the pin 68 up to the position shown by the dotted line in association with the drawing operation of the eject lever 30, and the coil spring 71 is displaced to the position shown by the dotted line by the forced rotation of the lever 69, where the distance between the free ends of the coil spring 71 is minimized to store a repulsive force. At the time when the rotating lever 69 is rotated up to the dotted line, locking of the slide plate 9 is completed, and the disc holder 49 is located at the ejectable position.

In association with the subsequent driving of the eject motor 46, the eccentric cam 45 is rotated to permit a small-diameter portion of the cam 45 to come into contact with the contact pin 42. As a result, the eject lever 30 is returned to the condition before ejecting the resilient force of the tension spring 36. Since the slide plate 9 is locked as mentioned above, it remains still, and the rotating lever 69 is rotated from the dotted line position to the solid line position in association with returning of the eject lever 30. By the repulsive force stored in the coil spring 71 and the rotational force of the rotating lever 69, the coil spring 71 is forced to the position shown by the chain line in FIG. 34. As shown in FIG. 21, the slider 62 is moved along the guide channel 54 of the cartridge holder 49 in the direction of arrow B by the displacement of the coil spring 71, and as a result, the magnetic disc cartridge 101 in the cartridge holder 49 is also drawn in the same direction.

When the slider 62 is moved until the contact portion 67 of the arm portion 64 abuts against the slant surface 112 of the restricting member 55 of the cartridge holder 49, the slider 62 is further moved to the front side (in the direction of the arrow B) to downwardly curve the arm portion 64 along the slant surface 112. As a result, the engaging pin 66 is disengaged from the engaging portion 108 of the magnetic disc cartridge 101 as shown by the solid line in FIG. 29, and is moved downwardly from the disc insertion passage 102. Accordingly, the magnetic disc cartridge 101 may be smoothly ejected from the disc inlet/outlet of the disc driving device. Thusly, the automatic ejecting operation of the magnetic disc cartridge 101 is terminated.

In the case that the magnetic disc cartridge 101 is manually ejected, an eject button (not shown) mounted to the operating button mount portion 31 of the eject lever 30 may be pushed. As a result, the eject lever 30 and the lever drawing member 38 are moved. Then, in the same manner as in the afore-mentioned automatic ejecting operation, the slide plate 9 is moved and the rotating lever 69 is rotated. Since the eccentric cam 45 is not rotated, the contact pin 42 is separated from the eccentric cam 45 by the movement of the eject lever 30.

As shown in FIG. 33, the rotary shaft 47 of the eject motor 46 is inserted through the vertical wall 41 of the lever drawing member 38. Therefore, the vertical wall 41 is provided with the recess 43 so that the movement of the lever drawing member 38 may not be hindered by the rotary shaft 47.

Having thus described the preferred embodiment of the invention, it should be understood that numerous structural modifications and adaptations may be restored to without departing from the spirit of the invention.

What is claimed is:

1. A disc driving device comprising:
   a housing having an insertion slot at a front portion thereof for insertion of a disc cartridge in a horizontal insertion direction toward a rear portion of said housing and for ejecting the cartridge toward the front portion of said housing;
   a cartridge holder having an insertion passage for receiving the cartridge inserted through the insertion slot, wherein said cartridge holder is movable so as to move a fully inserted cartridge in vertical directions between an ejecting position and a loading position in said housing;
   moving means for moving said cartridge holder with the cartridge fully inserted therein between the ejecting position and the loading position in the housing;
   locking means for locking said moving means such that said cartridge holder is held in the ejecting position and for releasing said moving means such that said cartridge holder is moved to the loading position;
   a slider having means for engaging a front end of a cartridge partially inserted to a predetermined position in the insertion passage of the cartridge holder such that the slider is displaceable with the cartridge inwardly toward a fully inserted position in the housing, said slider further having a lock release member for actuating said locking means at the fully inserted position of the cartridge in order to automatically release said moving means to move the cartridge to the loading position in said housing; and
   a spring member having one end engaged with the slider such that is moved with the slider as the cartridge is further inserted along the insertion passage, wherein the one end is moved to a position where the spring member becomes fully compressed and a direction of applied force of the spring member becomes reoriented along the insertion direction such that the applied force of the spring member is exerted on said slider engaged with the cartridge in order to automatically pull the cartridge inwardly to the fully inserted position.

2. A disc driving device according to claim 1, wherein said moving means is a slide plate biased by tension springs toward the front portion of said housing, said locking means is a pivotable lock lever having an engaging portion on one end, said slide plate has a first projection which is engaged by said engaging portion in order to lock said slide plate against movement toward the front portion of the housing, and said slide plate further has inclined cam slots formed in side portions thereof in which rollers mounted on said cartridge holder are engaged, wherein said cartridge holder is moved vertically as said rollers are cammed along said cam slots from the ejecting position to the loading position when said lock lever is actuated to release said slide plate toward the front portion of said housing.

3. A disc driving device according to claim 2, further comprising a rotatable lever in said housing to which the other end of the spring member is mounted, an eject lever having an actuation end extending from said housing and an operation end extending into said housing, said eject lever being biased by tension springs in the direction of the front portion of said housing, and a driving unit disposed in said housing for engaging said actuation end of said eject lever to pull said eject lever in the direction of the rear portion of said housing upon initiation of an ejecting operation,
   said eject lever having a first engaging portion engaged with a second projection on said slide plate for moving said slide plate rearwardly to a position where said engaging portion of said lock lever again engages said first projection on said slide plate to lock said slide plate in the ejecting position during the ejecting operation, whereby said cartridge holder is moved vertically by said rollers cammed in said cam slots of said slide plate from the loading position back to the ejecting position, and a second engaging portion engaged with a projection on said rotatable lever for rotating it to move said other end of said spring member to a position where said spring member becomes fully compressed and the applied force of the spring member on said slider becomes reoriented along an ejecting direction, opposite to the insertion direction, in order to automatically eject the cartridge from said cartridge holder out through said insertion slot.

* * * * *

UNITED STATES PATENT AND TRADEMARK OFFICE
Certificate

Patent No. 4,707,819              Patented November 17, 1987

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Tadami Sugawara and Masuo Okita.

Signed and Sealed this Fourth Day of April, 1989.

Jeffrey V. Nase,
*Supervisory Petitions Examiner,*
*Office of the Deputy Assistant*
*Commissioner for Patents.*